United States Patent
Yuschik et al.

(10) Patent No.: US 6,356,868 B1
(45) Date of Patent: *Mar. 12, 2002

(54) VOICEPRINT IDENTIFICATION SYSTEM

(75) Inventors: Matthew J. Yuschik, Wakefield, MA (US); Robert J. Slezak, Wilmette, IL (US)

(73) Assignee: Comverse Network Systems, Inc., Wakefield, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/422,851

(22) Filed: Oct. 25, 1999

(51) Int. Cl.[7] .................. G01L 17/00; G01L 15/04; G01L 15/22; G01L 21/00
(52) U.S. Cl. ............... 704/246; 704/251; 704/247; 704/252; 704/273
(58) Field of Search ................ 704/273, 231, 704/246, 251

(56) References Cited

U.S. PATENT DOCUMENTS

| | | | |
|---|---|---|---|
| 5,127,043 A | | 6/1992 | Hunt et al. .................. 379/88 |
| 5,274,695 A | | 12/1993 | Green ......................... 379/88 |
| 5,297,183 A | * | 3/1994 | Bareis et al. ................. 379/88 |
| 5,659,597 A | * | 8/1997 | Bareis et al. ................. 379/88 |
| 5,745,555 A | * | 4/1998 | Mark ........................ 379/93.03 |
| 5,806,040 A | * | 9/1998 | Vensko ...................... 704/273 |
| 5,897,616 A | * | 4/1999 | Kanevsky et al. ........... 704/273 |
| 5,913,192 A | * | 6/1999 | Parthasarathy et al. ...... 704/256 |
| 6,104,995 A | * | 8/2000 | Shimada et al. ............ 704/273 |
| 6,107,935 A | * | 8/2000 | Comerford et al. ......... 704/273 |
| 6,157,848 A | * | 12/2000 | Bareis et al. ................. 379/88 |

* cited by examiner

Primary Examiner—Richemond Dorvil
Assistant Examiner—Daniel A. Nolan
(74) Attorney, Agent, or Firm—Staas & Halsey LLP

(57) ABSTRACT

A voiceprint identification system identifies and verifies a user from voice data collected from a single interaction with the user. The voice data is a number, word phrase or any utterance chosen by the user. A first speech-processor processes the voice data to produce first match criteria, and a second speech-processor processes the same voice data to produce second match criteria, the first match criteria being different than the second match criteria. The first match criteria is used to select a subset of authorized persons, and, for each selected authorized person, the authorized person's voice template is retrieved from a database. The retrieved voice templates are individually compared to the second match criteria until either the second match criteria matches one of the retrieved voice templates or all the retrieved voice templates have been compared without matching the second match criteria.

27 Claims, 6 Drawing Sheets

VOICEPRINT IDENTIFICATION SYSTEM

BACKGROUND OF THE INVENTION

1. Field of the Invention

The present invention is directed to access control systems, and, more particularly, to access control based on voiceprint identification.

2. Description of the Related Art

Access control systems are used to prevent unauthorized users from gaining access to protected resources, such as computers, buildings, automatic teller machines (ATMs), credit cards and voicemail systems. When a user attempts to access a protected resource, a typical access control system engages in one or more interactions with the user, such as prompting the user and requiring him to enter an identity of an authorized person (the user's purported identity) and a valid passcode (sometimes called a personal identification number or PIN). For example, a typical voicemail system requires a user to first enter his mailbox number and then a passcode by pressing keys on his telephone. Only if the entered passcode matches the passcode associated with the entered mailbox number is the user deemed to be a subscriber and allowed to further interact with the system, i.e. to access a restricted resource, a mailbox in this case and to retrieve messages or send messages to access a restricted resource, a mailbox in this case, and to other subscribers.

The advantages of using a voiceprint system over standard PIN number systems are several. First, it is quicker and more convenient to speak instead of having to punch codes into a numeric keypad. Also, if the user is required to enter his PIN number by pressing telephone keys, if she is not using a touch-tone phone or if she is using a phone that does not allow tone codes such as a cellular or cordless phone, then this would be impossible. Also a voiceprint system is more secure, as unlike the standard PIN number system, even if an impostor obtains a subscriber's passcode her voiceprint will not match or allow her to gain access.

Voiceprint access control systems use discriminating characteristics of each authorized person's voice to ascertain whether a user is authorized to access a protected resource. The sound of a speaker's voice is influenced by, among other things, the speaker's physical characters, including such articulators as the tongue, vocal tract size, and speech production manner, such as place and rate of articulation. When a user attempts to access a protected resource, a typical voiceprint system samples an utterance produced by the user and then compares the voiceprint of the utterance to a previously stored voiceprint of the authorized person, whom the user purports to be.

Voiceprint systems must be trained to recognize and differentiate each authorized person through her voice. This training involves sampling each authorized person's voice while she utters a predetermined word or phrase and then processing this speech sample to calculate a set of numeric parameters (commonly called the acoustic features in a "voice template" of the speaker's voice). This voice template is stored, along with other voice templates, in a database that is indexed (sometimes known as keyed) by the identity of the speaker.

The parameters of a voice template quantify certain biometric characteristics of the speaker's voice, such as amplitude, frequency spectrum and timing, while the speaker utters the predetermined word or phrase. A speaker's voice template is fairly unique, although not as unique as some other characteristics of the speaker, such as the speaker's fingerprint. For example, identical twins are likely to have nearly indistinguishable voices, because their vocal tracts are similarly shaped.

When a user attempts to gain access to a protected resource, the user enters his purported identity, and then a conventional voiceprint identification system uses this identity to index into the database and retrieves a single voice template, namely the voice template of the authorized person who the user purports to be. The system prompts the user to speak a predetermined word or phrase and samples the user's voice to create a voice template from the user's utterance. The system then compares the user's voice template to the authorized person's voice template using one or more well-known statistical decision-theoretic techniques. This comparison produces a binary (match/no match) result. If the two voice templates are sufficiently similar, the voice templates are said to match (as that term is used hereinafter) and the user is deemed to be the authorized person, otherwise the voice templates are said to not match and the user is deemed to be an impostor.

The statistical decision associated with hypothesis testing (match/no-match) is characterized by two types of errors: false rejection (Type I errors) and false acceptance (Type II errors). The algorithms used in the comparison are typically adjusted so that the likelihood of Type I errors is approximately equal to the likelihood of Type II errors.

There are two kinds of speech recognition technology packages. The first is Speaker-Independent (SI) speech recognition technology, which can recognize words and does not require training by the individual user. The disadvantage of SI technology is the active vocabulary of words it can generally recognize is limited to reduce errors and calculation time. The second type of speech recognition technology is Speaker-Dependent (SD) technology, which requires training of each word by each individual user but has significantly higher accuracy for the user.

Speaker Independent recognition focuses on common acoustic features of a sound, and attempts to match many instantiations of an utterance with one, common "prototype" of that utterance (many-to-one mapping). recognition focuses on acoustically differentiating the (possibly different) features so that one pattern can be selected from many similar patterns (one-from-many mapping). This is the "subscriber", as described in this invention.

Prior art for voiceprint identification focuses SI technology is limited to confidently recognizing the unique acoustic pattern of the subscriber (one-from-one mapping). The invention permits more flexibility by combining the two ASR technologies so that SI ASR is used to identify a subset of subscribers (a cohort), and SD ASR is used to verify a particular member of the cohort (the subscriber).

As commonly used in the art, "identification" means ascertaining a user's purported identity, and "verification" means ascertaining if the user's voice matches the voice of the specified, e.g. identified, speaker.

Some prior art voiceprint identification systems assign a unique spoken passcode to each user, such as a random number or the user's social security number. Because each user has his own passcode, the voiceprint identification system can readily access the user's account once it identifies the user from his passcode.

Requiring each authorized person's password to be unique poses problems. For example, authorized persons cannot readily choose or change their passwords. Additionally, using preassigned numbers, such as a user's social security or telephone number, may pose security problems.

What is needed, therefore, is a voiceprint identification system that identifies and verifies a user from a single utterance, but that permits multiple authorized persons to have identical passwords. A system that simply derives a voice template of the user's voice sample and then exhaustively searches an entire database for a matching voice template would be slow, because this database stores a large quantity of data, associated with each and every authorized person. Furthermore, such a system would produce an unacceptably high rate of Type I or Type II errors. As the number of valid templates increases, the user's voice template is increasingly likely to be closer to one of the valid voice templates. Adjusting the comparison algorithms to reduce the likelihood of Type II (false acceptance) errors would raise the likelihood of Type I (false rejection) errors to an unacceptably high value.

"Objectives of the invention include implementing more secure, efficient and user friendly voice identification systems."

The above objectives can be attained by a system that identifies and verifies a user from voice data collected from a single utterance by the user. At least two signal processors process the voice data, and each signal processor operates with different selection criterion. These selection criteria are used together to select at most one matching record of an authorized person from a database of authorized persons. Each individual selection criterion optimally partitions the database into two subsets of records: a subset of selected records and subset of non-selected records. The matching record is defined as the intersection of the subsets of selected records. If a single matching record is selected, the user is deemed to be identified and verified as the authorized person who corresponds to the matching record. On the other hand, if no matching record is selected, the user is deemed not to be an authorized person.

These together with other objectives and advantages, which will be subsequently apparent, reside in the details of construction and operation as more fully hereinafter described and claimed, reference being had to the accompanying drawings forming a part hereof.

DESCRIPTION OF THE PREFERRED EMBODIMENT

By analogy, the invention selects a record matching a caller in a manner similar to selecting a playing card from a stack of cards by identifying a card suit and verifying a card number as selection criteria. Each of the two selection criteria can identify a subset containing more than one card, but the intersection of the subsets identifies at most one card. The invention, by analogy, selects an acoustic card from more than 4 suites, and more than 13 card values.

Figure 1:
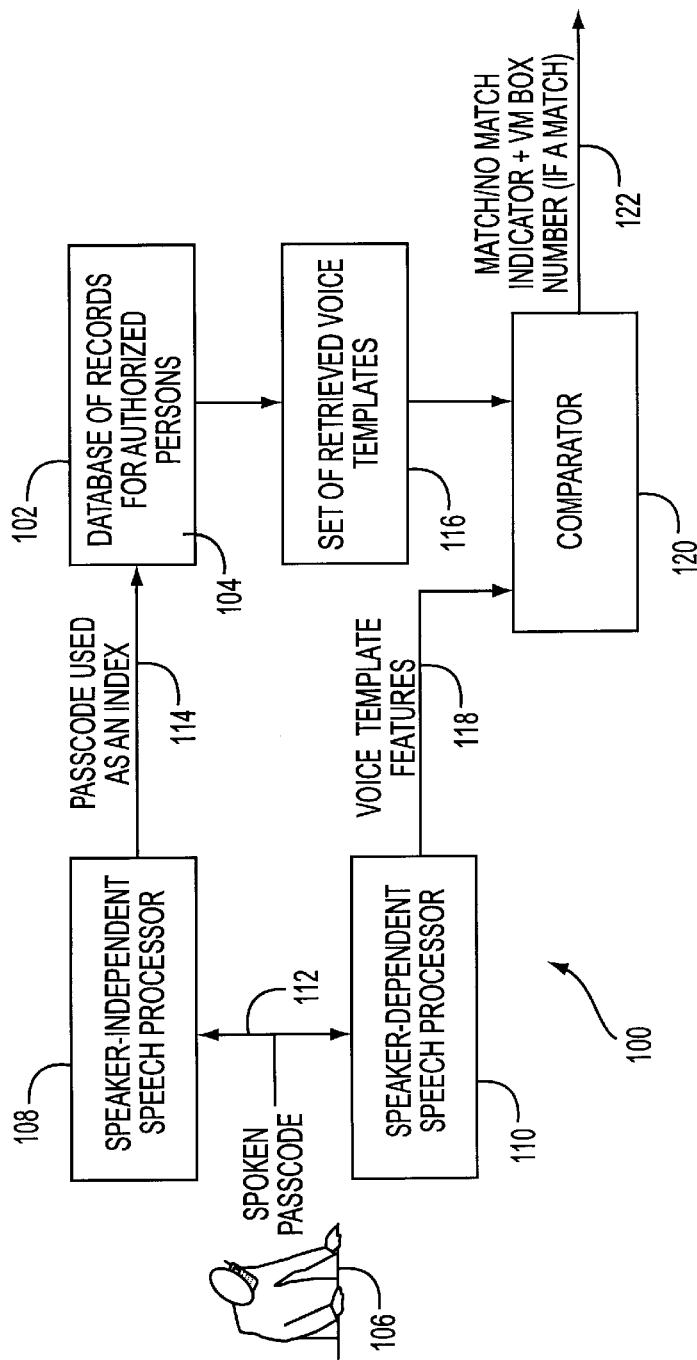
FIG. 1 is a block diagram of an access control system according to the present invention.
Figure 2:
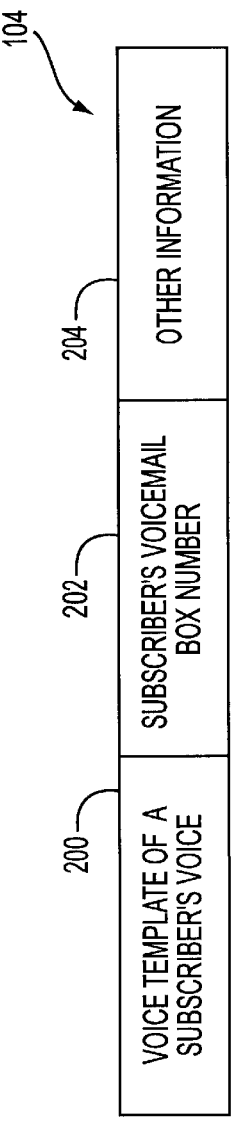
FIG. 2 is a diagram of a subscriber record stored in the database of FIG. 1.

FIG. 1 illustrates an access control system 100, which is preferably referenced to a portion of a voicemail system (not shown). A database 102 stores records 104, each record corresponding to a subscriber of the voicemail system. As shown in FIG. 2, each record 104 contains a voice template 200 of the corresponding subscriber's voice, the subscriber's voicemail box number 202 and other information 204 necessary for the operation of the voicemail system. Returning to FIG. 1, in the database 102, the records 104 are indexed by speakers' passcodes rather than, or optionally in addition to, being indexed and grouped into a cohort (or subset) by their unique voice mailbox numbers. The database 102 allows multiple records to be indexed by identical keys, because multiple subscribers are permitted to have identical passcodes.

To identify and verify a user 106 in a single interaction, the access control system 100 prompts the user to speak her passcode, and two speech processors 108 and 110 process the user's response 112. The first speech processor 108 uses well-known SI speech recognition technology, such as is commercially available from Voice Control Systems of Dallas, Tex., to convert the spoken passcode 112 into a word phrase, number or other keying symbol 114. This word phrase or number 114 is used to index into the database 102 and retrieves a set of one or more records, the "cohort," 116 which includes all the individual voice templates 200 that correspond to the subset of subscribers who have spoken the same word phrase or number, i.e. all the subscriber voice templates that correspond to the spoken passcode 112. The number of voice templates retrieved 116 is generally a small fraction of the total number of voice templates stored in the database 102, because passcodes are fairly unique, based on individual subscriber preferences. Preferably, the set of retrieved voice templates 116 is stored in a buffer (not shown) or a file prior to the comparison steps described below. Alternatively, the set of voice templates 116 can be retrieved and compared one at a time.

If no record 104 in the database 102 corresponds to the word phrase or number 114, the user 106 is prompted again, and the above-described process is repeated. Alternatively, a "second-best" word phrase or number proposed by the SI speech processor 108 can be used for the word phrase or number 114. This corresponds to selecting the alternative using different values of Type I and Type II error thresholds for the SI ASR process. If, after a predetermined number of retries, no record corresponds to the word phrase or number 114, the user 106 is prompted to enter his voicemail box number and passcode separately, and the user is identified and verified as in a conventional access control system.

The second speech processor 110 uses well-known SD voice recognition technology, such as is available from Voice Systems of Dallas, Tex., to calculate a separate second set of parameters, i.e. a voice template 118 of discriminating acoustic features, from the spoken passcode 112. A comparator 120 compares the calculated voice template 118 to each of the retrieved voice templates 116. If the calculated voice template 118 matches one of the retrieved voice templates 116 within the acceptance limits specified by the Type I and Type II error thresholds, the user 106 is considered identified and verified, and the speaker's voicemail box number 202, or other information 204, is retrieved from the database record that corresponds to the matching voice template. A match/no-match indicator 122 and, if appropriate, the voicemail box number and/or other information are sent to the rest of the voicemail system (not shown).

On the other hand, if the calculated voice template 118 does not match any of the retrieved voice templates 116, the user 106 is prompted to speak her passcode again and the above-described process is repeated. After a predetermined number of retries, if the calculated voice template 118 still does not match any of the retrieved voice templates 116, the user 106 is prompted to enter her voicemail box number, and the user is identified and verified as in a conventional access control system.

The user interface also allows the user 106 to change his passcode and voice template stored in the database record 104. After the user 106 has logged into the system, he can select an option, which allows him to re-record his passcode and voice template 200. Re-recording the voice template is necessary in case the user decides to transfer his account to another user 106 or is encountering a high number of Type I or Type II errors. The interface can also allow multiple users to share the same account and passcode, for example a husband and wife that have a joint credit card. The system can learn to recognize the same passcode spoken by both authorized users of the account. This is convenient for shared account holders in that they both can have the same passcode. Additionally, shared account holders can use different passcodes to access the same account.

In another embodiment, since an utterance is basically an audio signal, any type of utterance can be a passcode. For example, a speaker can spell his first name or sing a song refrain. Features such as pitch, pitch rate change, high frequency captured, glottal waveform, and temporal duration of sound events can be detected for use as a passcode. In fact, any acoustic information, even beyond human hearing ranges, can be used. At least two different signal processors process this audio signal, and each signal processor produces a digital output that represents a different characteristic of the audio signal. For example, a speech recognizer could convert a spoken word or phrase into a set of alphanumeric characters. Each authorized person's record in the database is indexed according to at least two of these distinctive features, and each authorized person's record contains data that represent these at least two characteristics. When a user makes an utterance to gain access to a protected resource, then at least two different signal processors process this utterance and the digital outputs are used to index into the database and retrieve subscriber information.

To implement this invention, a database record (see FIG. 2) type containing subscriber specific SD information, is created. The database record contains the subscriber's passcode information, a voice template 200 of a subscriber's voice, used for a comparison with 112, used for a comparison with 112, a subscriber's voicemail box number 202 and any other information 204 necessary to the application. For the present invention, it is preferable to have the records sorted by passcode identifier 114, so that once the passcode has been identified by the SI system as an index its cohort 116 is easily accessed.

Figure 3:
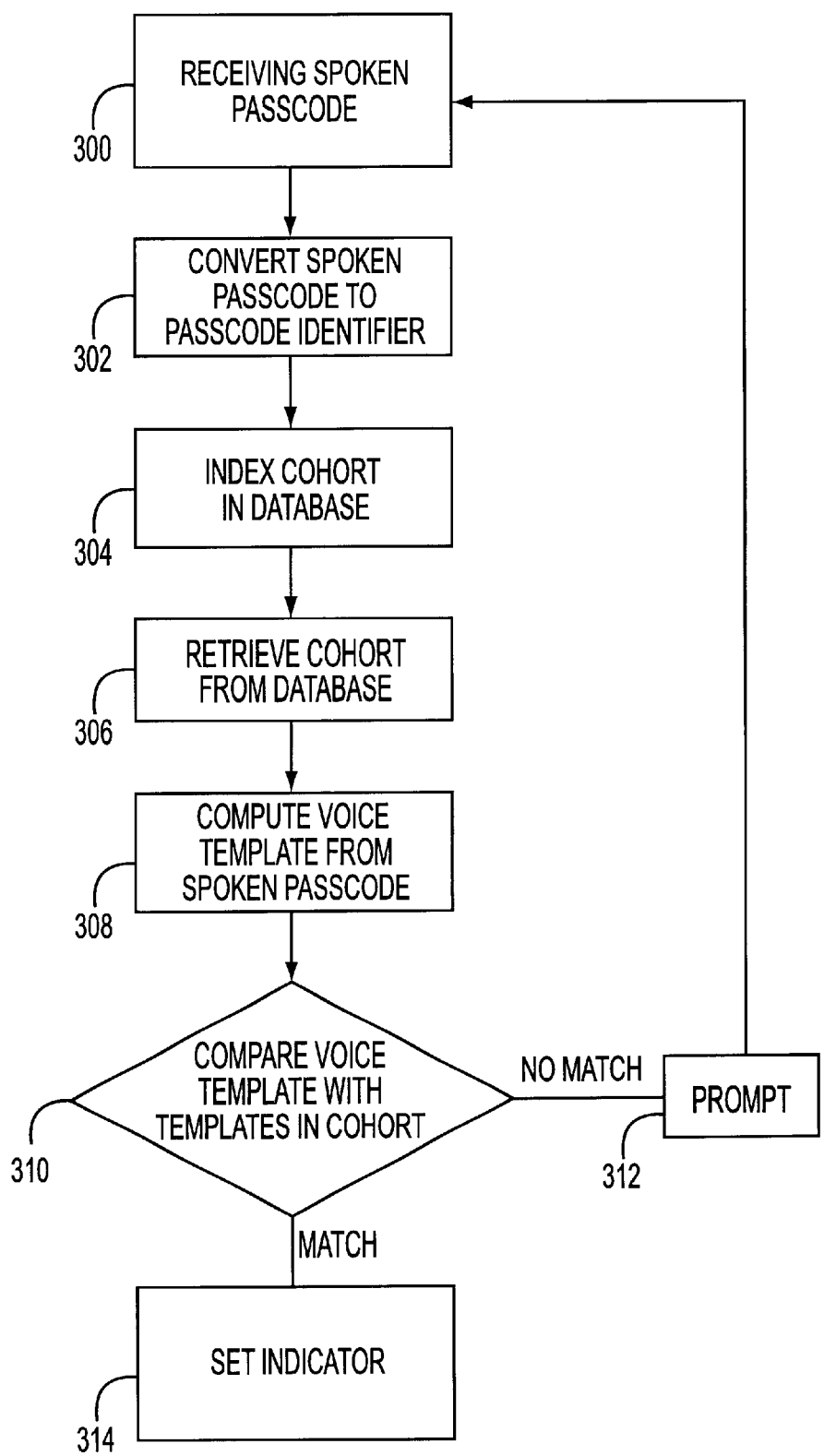
FIG. 3 is a flowchart of the serial embodiment of the process of identifying a user from his chosen passcode.

In a serial embodiment of the present invention (see FIG. 3), the user speaks 300 a passcode to gain access to a protected resource. A SI speech-recognition processor converts 302 the spoken passcode into a passcode identifier, a word phrase or number, and then uses the passcode identifier to index 304 into a database of authorized persons and retrieve 306 the cohort 116. Multiple authorized persons can have identical passcodes. A SD voice-recognition processor then derives 308 a voice template from the user's speech, i.e. the spoken passcode, and compares 310 the derived voice template to the retrieved voice templates. The SD voice template is distinctive and has unique characteristics. If the derived voice template matches one of the retrieved voice templates within the confidence limits specified by Type I and Type II errors, the user is deemed 314 to be the authorized person who corresponds to the matching retrieved voice template. If there is no matching voice template in the cohort, then the system can re-receive the spoken passcode or prompt 312 the user to enter his account number manually. Alternatively, step 308 can be performed anywhere in between steps 300 and steps 310.

Figure 4:
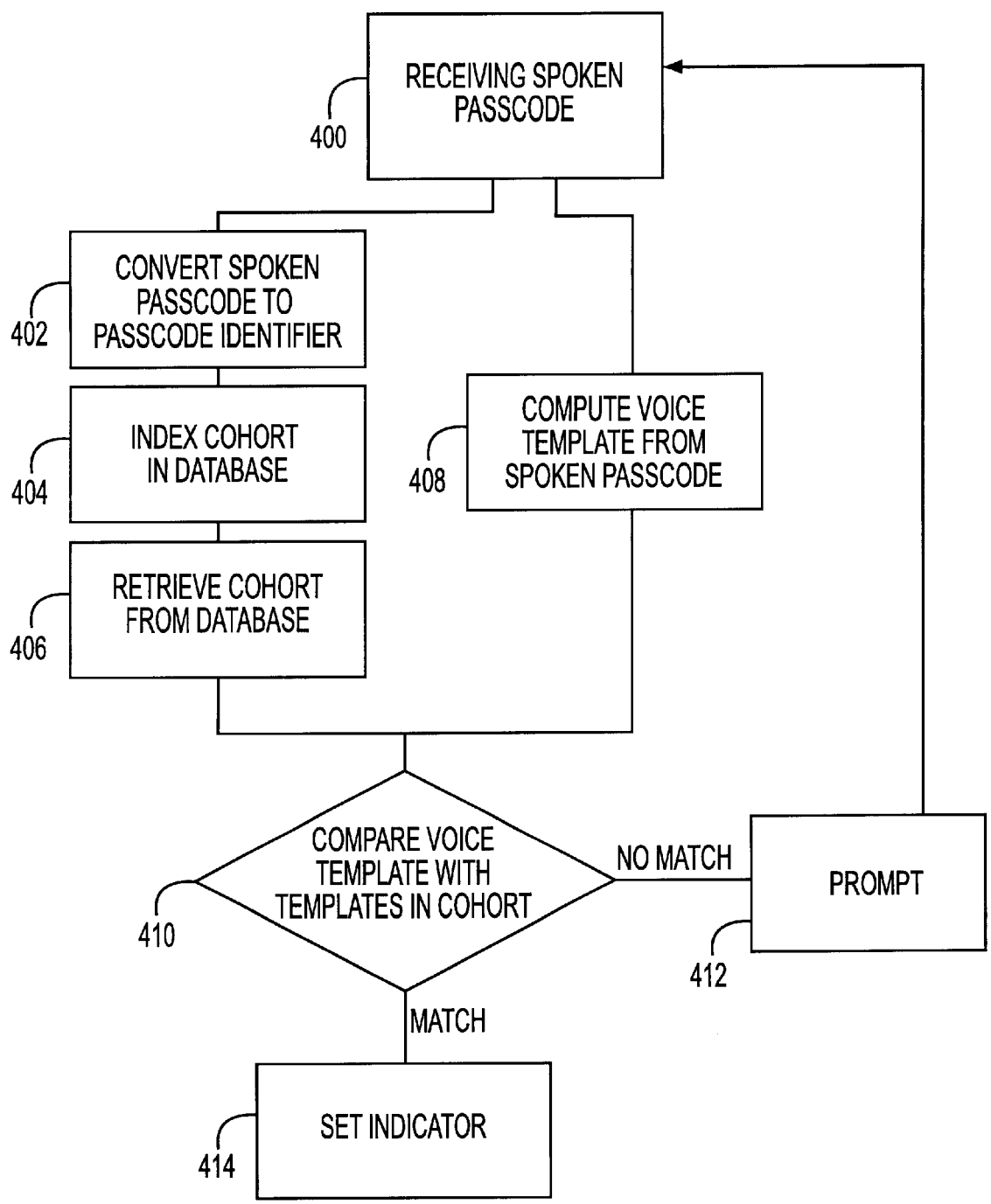
FIG. 4 is a flowchart of the parallel embodiment of the process of identifying a user from his chosen passcode.

The serial embodiment described above can also be modified slightly to improve performance by utilizing a parallel embodiment, as shown in FIG. 4. This is similar to the serial embodiment, with reference numbers 400, 410, 412 and 414 corresponding to reference numbers 300, 310, 312 and 314, respectively. However, the computation 408 of the SI voice template from the spoken passcode is performed simultaneously with the SI conversion 402 from the spoken passcode to the passcode identifier, indexing 404 the cohort in the database 404 and retrieving 406 the cohort from the database.

Using an embodiment of the present invention accessed via telephone, the caller's telephone number (if available to the system via PSTN technology such as caller ID or any other identification information) can be used in a number of ways to improve the system's performance during the comparison operation 310 and 410. Reducing the number of record comparisons is important because each comparison takes valuable resource time of a host unit running the system and reduces Type II errors since there will be fewer possible false acceptances.

Figure 5:
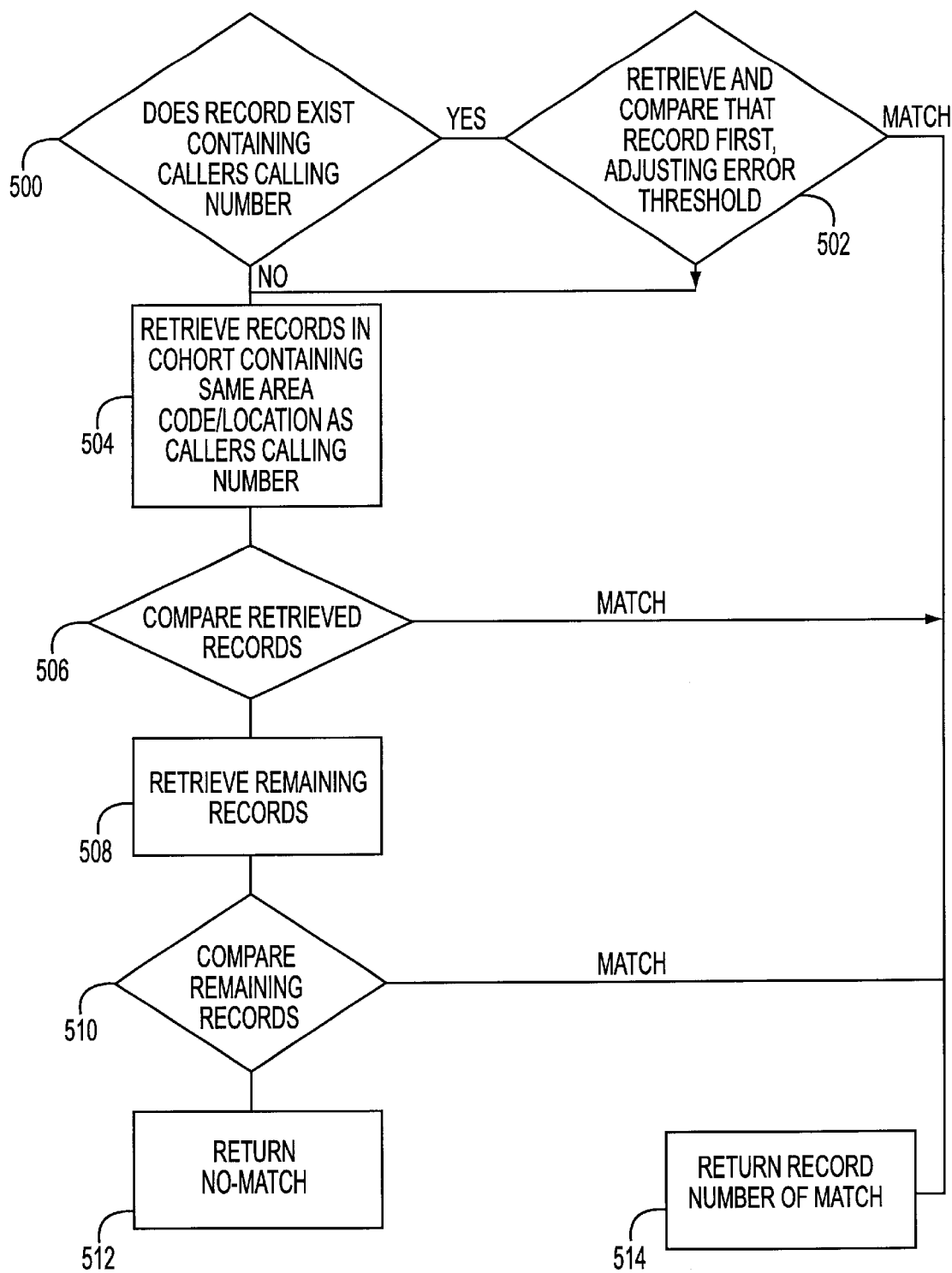
FIG. 5 is a flowchart of the process of optimized comparison step.

FIG. 5 illustrates one possible embodiment, in which the caller's calling telephone number can be used to reduce the number of comparisons required. After the user enters his passcode, if a record corresponding to the caller's (mailbox, telephone or network-based) number exists 500 in field 204 of the database record 104, then that record is checked 502 first for a match, saving the time of having to check every record in the cohort. If Type I error is low, the user is accepted. If the caller's number does not match, then the search is broadened to include members of the cohort that have a matching area code or similar geographic area which then can be retrieved 504 and checked 506 for a match. Finally, the rest of the cohort will be retrieved 508 and checked 510 for a match. The system administrator has the ability to enable or disable any of these options according to preferences, defining classes of security services. The final result will return a no-match 512 or the record number of the match 514.

In addition to using the caller's phone number to improve system performance, the caller's phone number can also be used to reduce Type I and Type II errors. When the user's spoken passcode is received and converted to its password identifier, the record in the cohort with the same phone number as the caller's is likely to be the account the caller is accessing. Therefore, when that particular speech template is being compared 502 to the spoken passcode, the Type I and Type II error thresholds can be adjusted to allow for a greater margin of error, i.e. allow fewer Type I errors and more Type II errors. This will permit accounting for background noises that may be present in the caller's home, or if the caller has a cold and sounds different.

The caller's phone number can also be used to improve security for applications, such as credit card transactions, where security is critical. If a caller makes numerous unsuccessful attempts to access an account, the system will end up returning 512 a no-match a number of times. At this point the system can store the caller's phone number (if available) and digital copies of his spoken passcode. This way the unauthorized user's own phone number and voice (unknown to him) will be stored in case it is needed later, say by the authorities.

In addition, the system administrator can enable different search methods during the record comparisons, according to the administrator's preferences. Either the system can search the entire cohort and return the record that contains the best match, among several matches, with the spoken passcode, or the system can stop searching the cohort once the first match is achieved. The former method would be more accurate and reduce Type II errors, because even if a match is found, it may belong to another user. Of course, the latter method is faster because it does not have to search the entire cohort, but this speed comes at the expense of more Type II errors.

Figure 6:
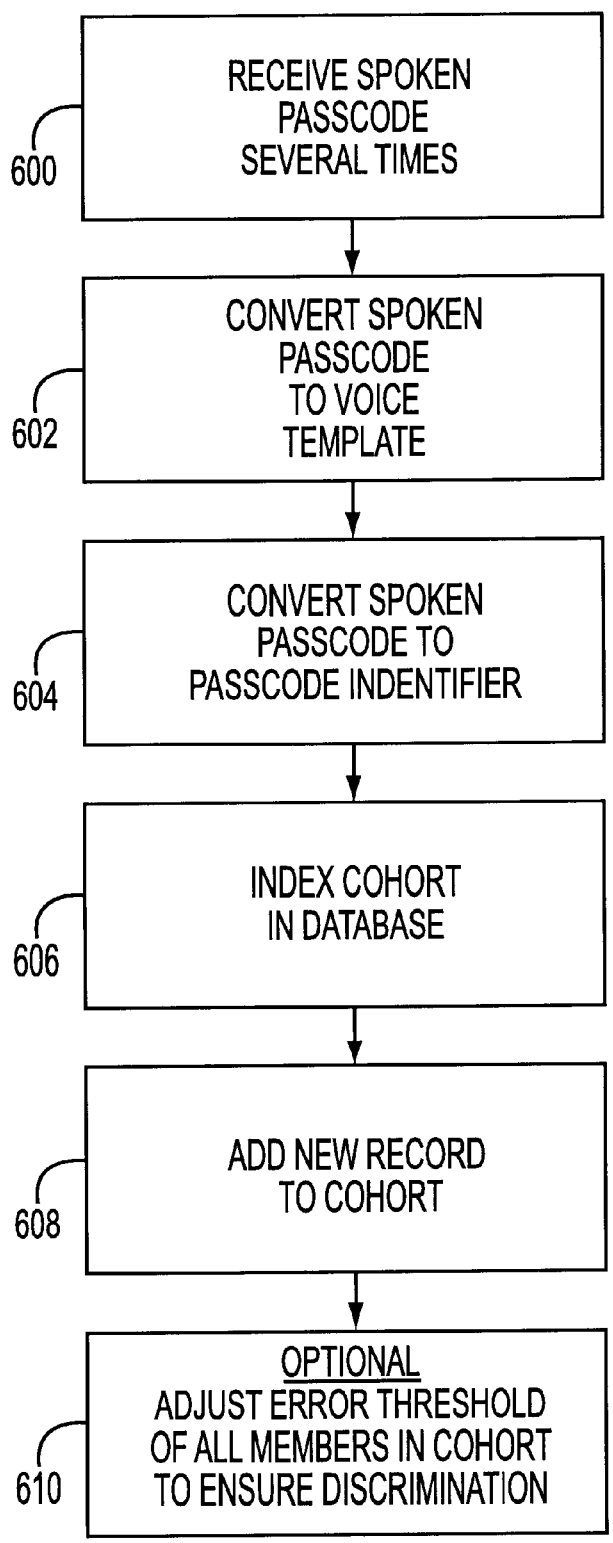
FIG. 6 is a flowchart of the process of initializing a new user.

FIG. 6 is a flowchart of the process to initialize a record. This includes the user having to speak 600 passcode, possibly several times, for the SD voice recognition technology to be trained to recognize the user's passcode. The spoken passcode is converted 602 to its voice template. The interface will then convert 604 the spoken passcode to a corresponding passcode identifier (or digital passcode), which is the spoken passcode reduced to a simple computer readable form used as an index. Once the passcode identifier is obtained, the cohort can easily be indexed 606. Then the new record can be added 608 with all the information the system requires.

The training may also include adjusting 610 the error threshold settings for that user and the other members of the cohort so that a maximum range for error will be allowed while still preserving discrimination between all members of the cohort. For example, consider a cohort with only 2 members, a male and a female. Since their voices will sound very different, a high margin of error can be tolerated. A higher margin of error is preferable because it allows a user to be properly identified even with background noises present or if he speaks in a different tone of voice. Now suppose a third member joins the cohort, with a voice template very similar to another member. A high margin of error is no longer permissible, as the two similar members may get mis-identified. Thus, the margin of error for the entire cohort or for the similar members should be reduced to prevent misidentification. Thus, the adjusting of error levels ensures discrimination between all members of a cohort.

Additionally, each time the system is accessed by a user speaking her passcode 300 or 400, the training mechanism can be activated in the background to use the spoken passcode to update the speech template stored in that users record, reducing the number of Type I and Type II errors over time.

Figure 7:
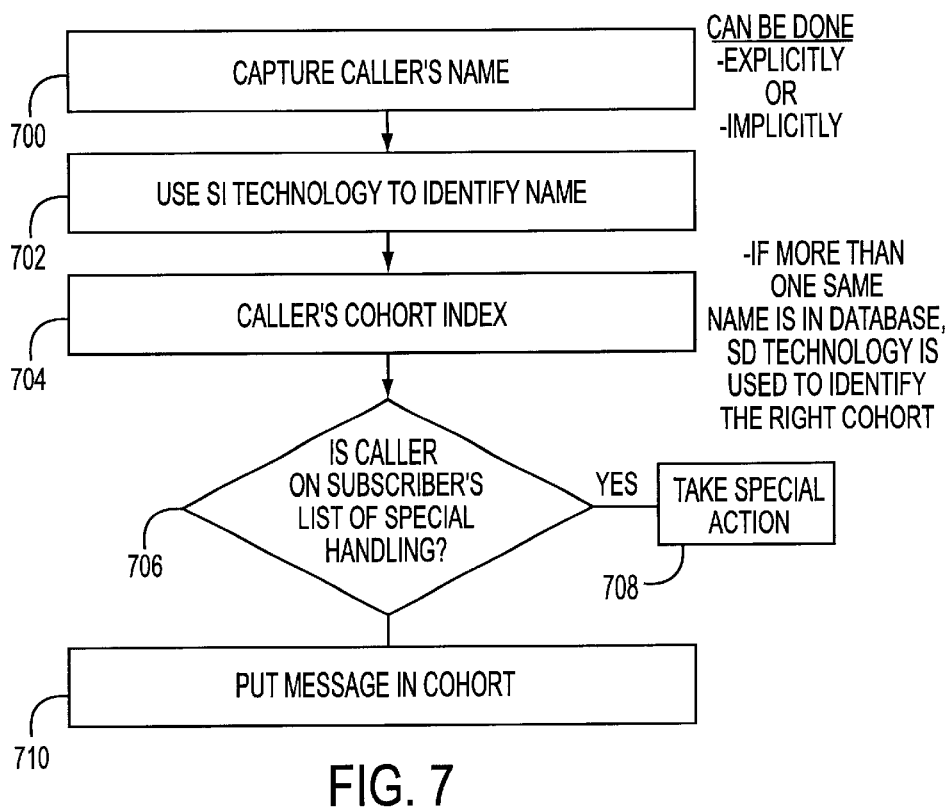
FIG. 7 is a flowchart of the process of leaving a message using the caller's cohort option.

In an additional embodiment, cohorts are also maintained for callers. This allows numerous additional features, such as allowing the subscriber to retrieve only messages from a selected caller. This embodiment is illustrated in FIG. 7. First, when a caller starts to leave his message, the caller's name is captured 700. This can be done explicitly, by separately prompting the caller for his name and then his message. The caller's name can also be captured implicitly, by analyzing each spoken word during the first few seconds of the message using SI technology to identify a name, since when a caller leaves a message he customarily will say something like, "Hi this is Bob . . . "

Then the system uses SI technology to identify the spoken name 702 (if not already done by the implicit process). Then, similar to the process used to index a subscriber's cohort, the caller's cohort is indexed 704. If more than one of the same name is present, for example if there are two people named 'Bob' leaving messages, then SD technology is used to identify the appropriate caller.

As an additional option, the subscriber can designate special handling for certain callers. For example, whenever 'Bob' calls, the call can be routed to his cellular phone. When a caller leaves a message, the system will check if the caller is on a subscriber's list for special handling 706, where it can then take the special action 708.

Finally, the system then stores the message in the appropriate caller's cohort 710.

Figure 8:
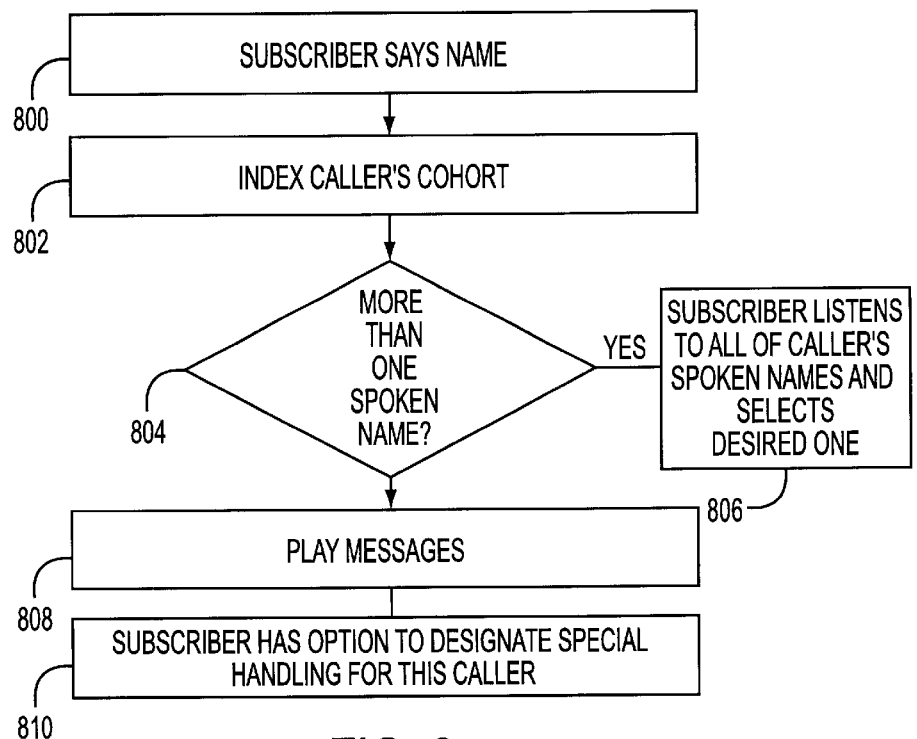
FIG. 8 is a flowchart of the process of retrieving messages from a desired caller using the caller's cohort option.

FIG. 8 illustrates the process by which the subscriber retrieves messages using the caller's cohort option. First, the subscriber says a name of a caller he wishes to hear messages from 800. Then, the system uses SI technology to index the caller's cohort 802. If more than one of the names exist (for example, two different "Bobs" have left messages) 804, then the system will play back each of the names spoken by the caller himself so that the subscriber can select which caller he desires 806. Then, all of the messages left by that particular caller are played 808. In addition, the subscriber has the option to designate special handling for this caller 810. For example, all future calls from this caller can be routed to his cell phone.

The caller's cohort option is especially beneficial for the subscriber who receives many calls daily and needs a convenient, automatic way to organize all of his incoming calls.

In a further embodiment, any additional information, biometric or not, may be added to the subscriber record and used to improve confidence. For example, retinal scans may be combined with the present voiceprint access method in order to reduce Type I and Type II errors.

Another embodiment of the present invention comprises a voiceprint identification system, comprising: a database storing a record for each user including a speech template and a passcode identifier; and a processor receiving and converting a spoken passcode spoken by a user into a corresponding passcode identifier and comparing said spoken passcode to each speech template stored in a corresponding subset.

What is claimed is:

1. A voiceprint identification system, comprising:
   a speaker-independent processor receiving and converting a spoken passcode chosen by a user into a corresponding passcode identifier;
   a speaker-dependent processor receiving and converting the spoken passcode to a voice template; and
   said speaker-independent and speaker-dependent processors operating simultaneously.

2. A voiceprint identification system, comprising:
   a database storing a record for each user including a speech template and a passcode identifier;
   a first processor receiving and converting a spoken passcode chosen by a user into a corresponding passcode identifier; and
   a second processor comparing said spoken passcode to speech templates stored in a corresponding subset.

3. A voiceprint identification system as recited in claim 2, wherein the spoken passcode chosen by the user can be any audio signal, including any sound created through variations of the articulatory mechanism, including a word or non-word in any language.

4. A voiceprint identification system as recited in claim 2, wherein said record includes a telephone number; and said second processor first compares the record in the subset with the phone number that matches a users calling number.

5. The voiceprint identification system as claimed in claim 2, wherein said record includes a phone number; and said second processor first compares the records in the subset with an area code or country code of a users calling number.

6. The voiceprint identification system as claimed in claim 2, wherein said database stores error threshold settings; said record includes a phone number; and said second processor adjusts said error threshold settings to allow greater margin for error when a users calling number is identical to the phone number stored in the record being compared.

7. A voiceprint identification system as recited in claim 2, further comprising a training apparatus which activates each time the user speaks the spoken passcode to gain access.

8. A voiceprint identification system as recited in claim 2, wherein said record includes error threshold settings; and said second processor adjusts said error threshold settings for each user in the subset when a new user is initialized.

9. A voiceprint identification system as recited in claim 2, wherein the second processor stops searching the subset once a comparison results in a match.

10. A voiceprint identification system as recited in claim 2, wherein the second processor completes searching the entire subset and returns a best match.

11. A voiceprint identification system as recited in claim 2, wherein multiple users can share the same account.

12. The voiceprint identification system as claimed in claim 2, wherein upon one or more unsuccessful attempts by the user to access an account corresponding to said passcode identifier, the system will store user's calling number and spoken passcode.

13. A voiceprint identification database system, comprising:
    passcode identifier data stored on a computer readable medium;
    biometric data associated with its respective passcode identifier stored on a computer readable medium; and
    a processor reading and writing the passcode identifier data and the biometric data from and to the computer readable medium,
    wherein the passcode identifier data and the biometric data are indexed on the computer readable storage medium according to the passcode identifier data, so that a spoken passcode is used for indexing a set of passcode identifier data by converting the spoken passcode into the passcode identifier data.

14. A voiceprint identification database as recited in claim 13, wherein said database stores additional information particular to an individual along with said biometric data.

15. A voiceprint identification system, comprising:
    a database storing a record for each user, the record including a speech template, a passcode identifier, a telephone number, biometric data and error threshold information;
    a first processor receiving and converting the spoken passcode into its corresponding passcode identifier;
    a second processor comparing said spoken passcode to speech templates stored in a corresponding subset;
    said spoken passcode chosen by the user can be any audio signal in addition to a spoken number or a word phrase;
    said second processor first compares the record in the subset with the phone number that matches the users calling number;
    said second processor compares the records in the subset with an area code identical to an area code of the users calling number;
    said second processor adjusts error threshold settings to allow greater margin for error when users calling number is identical to phone number stored in record being compared;
    training apparatus activating each time user speaks his spoken passcode to gain access;
    said second processor adjusting error threshold settings for each user in the subset when a new user is initialized in order to assure discrimination between records in the subset;
    said second processor can be set to stop searching the subset once a comparison results in a match;
    said second processor can be set to complete searching the entire subset and return a best match;
    a security device storing, upon one or more unsuccessful attempts by the user to access an account corresponding to said passcode identifier, the user's calling number and spoken passcode; and
    said passcode may be any sound created through variations of the articulatory mechanism, and is a word or non-word in any language.

16. A method of operating a voiceprint identification system, comprising:
    allowing a plurality of users to choose their own respective spoken passcode;
    storing records for each user, including a speech template and a passcode identifier;
    receiving a spoken passcode by a user;
    converting the spoken passcode to a passcode identifier; and
    searching a subset of the passcode identifier for a match between the spoken passcode and the speech templates.

17. A computer readable storage media for controlling a computer to perform:
    storing a voiceprint identification system process;
    allowing a plurality of users to choose their own respective spoken passcodes;
    storing records for each user including a speech template and a passcode identifier;
    receiving a spoken passcode by a user;
    converting the spoken passcode to a passcode identifier; and
    searching a subset of the passcode identifier for a match between the spoken passcode and the speech templates.

18. An access control process, comprising:
    converting a user defined spoken passcode into a digital passcode;
    converting the spoken passcode into a spoken voice template;
    retrieving a stored voice template using the digital passcode;
    comparing the stored and spoken voice templates; and
    indicating access is allowed when the stored and spoken voice templates match within a tolerance.

19. A process as recited in claim 18, wherein producing the digital passcode uses a speaker independent voice process and producing the voice template uses a speaker dependent voice process.

20. A voiceprint identification system for ascertaining whether a user is an authorized person by processing speech from the user, the voiceprint identification system comprising:

a first speech-processor to receive the speech and providing first match criteria;

a database for storing voice templates of authorized persons, the database being coupled to the first speech-processor such that the first match criteria select a subset of one or more of the stored voice templates;

a second speech-processor to receive a same speech as the first speech-processor and providing second match criteria, the first match criteria being different from the second match criteria; and a comparator coupled to the database to receive the subset of voice templates and coupled to the second speech-processor to receive the second match criteria, the comparator providing a match indicator when the second match criteria matches exactly one of the subset of voice templates, otherwise the comparator providing a no-match indicator.

21. A method comprising:

converting an audible passcode into a digital passcode;

selecting a subset of records using the digital passcode; and retrieving information related to the audible passcode from the selected subset.

22. A method as recited in claim 21, wherein the audible passcode can be be chosen by a user of the audible passcode.

23. A computer readable storage medium, storing a program instructing a computer to perform:

converting an audible passcode into a digital passcode;

selecting a subset of records using the digital passcode; and retrieving information related to the audible passcode from the selected subset.

24. A computer readable storage medium as recited in claim 23, wherein the audible passcode can be chosen by a user of the audible passcode.

25. An apparatus comprising:

a converter converting an audible passcode into a digital passcode;

a selector selecting a subset of records using the digital passcode received from the converter; and a retriever retrieving information related to the audible passcode from the subset selected by the selector.

26. An apparatus as recited in claim 25, further comprising a choosing unit allowing a user to select the user's own audible passcode.

27. A voiceprint identification system as recited in claim 1, wherein the spoken passcode is chosen by the user.

* * * * *

UNITED STATES PATENT AND TRADEMARK OFFICE
CERTIFICATE OF CORRECTION

PATENT NO.    : 6,356,868 B1
DATED         : March 12, 2002
INVENTOR(S)   : Matt Yuschik et al.

It is certified that error appears in the above-identified patent and that said Letters Patent is hereby corrected as shown below:

<u>Column 2,</u>
Line 39, before "recognition" insert -- Speaker Dependent --.

Signed and Sealed this

Fourth Day of February, 2003

JAMES E. ROGAN
*Director of the United States Patent and Trademark Office*